June 21, 1955     N. R. HASTINGS     2,711,099
PRECIPITATION GAUGE
Filed Dec. 5, 1952
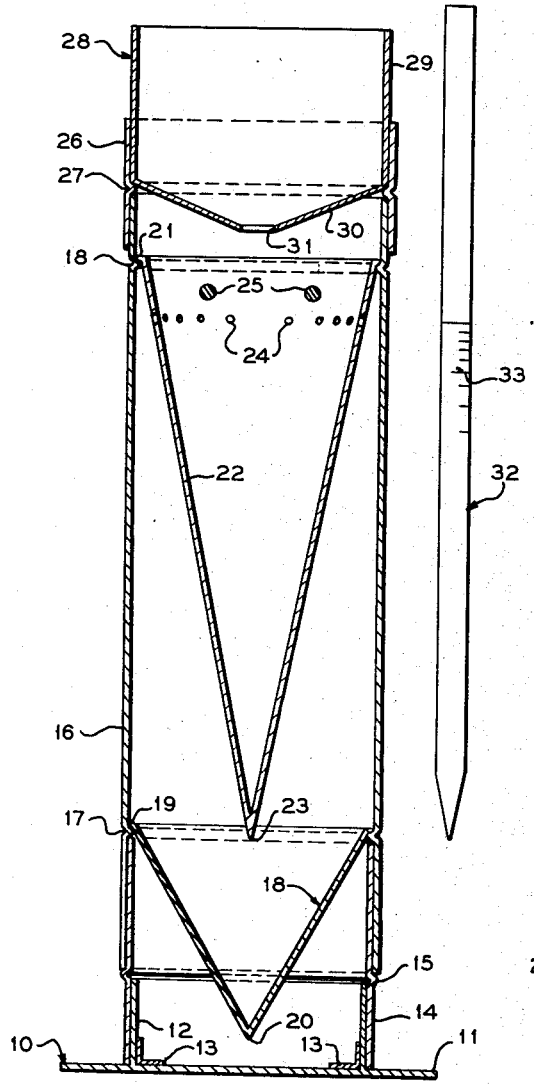
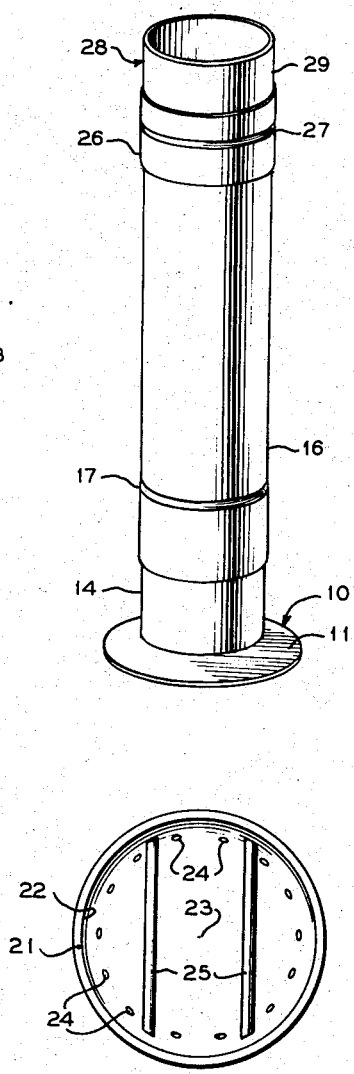
INVENTOR
N. R. HASTINGS
BY *A. Yates Dowell*
ATTORNEY

United States Patent Office 2,711,099
Patented June 21, 1955

2,711,099

PRECIPITATION GAUGE

Norman R. Hastings, Huron, S. Dak., assignor to Walk Time, Inc., Huron, S. Dak., a corporation of South Dakota Application December 5, 1952, Serial No. 324,232

5 Claims. (Cl. 73—171)

This invention relates to measuring devices and more particularly to a gauge adapted to receive rain or snow and indicate the amount of precipitation.

Devices for measuring rainfall or snowfall have been used heretofore but these have required separate devices for rain and snow, have been relatively difficult to use, and have had to be protected from freezing.

Accordingly it is an object of the present invention to provide a gauge usable for the measurement of either rain or snow.

A further object of the invention is to provide a gauge for the measurement of rain or snow, which is simple and inexpensive to construct, easy to use, and which is not injured if the contents freeze.

A further object is to provide a gauge having an outer chamber for the reception of snow or to receive an overflow of rain from an inner chamber, the inner chamber being removable when the device is used for the measurement of snow.

These and further objects of the invention will become apparent from the following description in conjunction with the accompanying drawings in which:

Fig. 1 is a longitudinal section through a device constructed in accordance with the invention;

Fig. 2, a top plan view of the measuring cone;

Fig. 3, a perspective to a reduced scale of the device; and

Fig. 4, a measuring stick which may be used with the device.

Briefly stated the illustrated embodiment includes a base on which a cylinder is vertically supported, the cylinder being closed at the bottom by a cone with its apex extending downwardly. Near the upper portion of the cylinder the base of a second cone is mounted, the cone extending in the cylinder substantially the length thereof so that its apex is adjacent to the lower portion thereof. The second cone is perforated near its upper portion in order that overflow may pass into the cylinder therebeneath. A cap having a funnel is mounted for directing rain into the upper cone. The funnel is removable when snow is to be received, and the upper cone may also be removed when snow is to be received, if desired.

Referring to the drawing the device comprises a base or stand 10 which has a flat circular bottom 11 having an upstanding collar or sleeve 12 attached thereto and braced by angle members 13. A sleeve or cylindrical extension 14 is supported on the base and has a central ridge or bead 15 spaced intermediate its ends.

An elongated measuring cylinder 16 has internal ridges or beads 17 and 18 spaced from the bottom and top portions respectively of the cylinder, the bottom portion of the cylinder being received by the extension 14 of the base, the ridge 15 on the extension 14 engaging the lower extremity of the cylinder 15, and the ridge 17 on the cylinder 16 engaging the upper extremity of the extension 14 to maintain the parts in the desired relationship.

A cone 18 is attached by a rim 19 on its base to the ridge 17 within the cylinder 16 and has its apex 20 below its base and spaced just above the bottom 11 thereof, the cone providing a bottom for the cylinder 16.

Suspended by a flange 21 at its base and within the cylinder 16 is a second cone 22 which extends substantially the length of the cylinder and terminates, or has its apex 23, in the region of the lower cone 18, the apex in the drawing being located substantially in the plane of the base of the lower cone. Cone 22 has a plurality of apertures or perforations 24 intermediate its ends and preferably near the upper portion thereof, the perforations being located in a plane substantially transversely of the axes of the cone and the cylinder and providing an overflow from the cone 22 to the cylinder 16.

A pair of rods or struts 25 extends across the mouth of the cone 22 to facilitate placement of the cone in the cylinder and its removal therefrom.

A sleeve 26 having an internal ridge or bead 27 is mounted on and forms an extension of the upper end of the cylinder 16, the ridge 27 supporting the sleeve on the upper end of the cylinder.

A cap or funnel 28 has cylindrical side walls 29 of substantially the same inner diameter as that of the cylinder 16 and a frusto-conical bottom 30 with a central opening 31, the cap being received in the sleeve 26 with the junction between the lower end of the wall of the cylinder 29 and the base of the frusto-conical portion resting on the internal ridge 27.

For the measurement of rain the device is preferably used completely assembled as shown in Figs. 1 and 3, rain being received in the cap or funnel 28 and directed to the cone 22. The cone is adapted to receive a predetermined amount of rainfall before overflow through the perforations passes into the cylinder 16.

The device may be constructed of various materials such as metal or plastic. If made of plastic it is preferred that the plastic be transparent and graduations applied to either or both the inner cone 22 and cylinder 16. Although such markings may be usable if the device is made of plastic it may be preferred that a measuring stick 32 having graduations 33 be employed. It is contemplated that the inner cone 22 may be made with a high degree of accuracy so that any overflow through cylinder 16 may be poured into the cone after the latter is emptied to obtain the total precipitation.

For use in measuring snow, or a combination of rain and snow, the cap 28 and inner cone 22 are normally removed. In order to measure the contents of the cylinder 16 the snow or rain and snow combination is melted and poured into the cone 22. The inner cone 22 may also be used to receive snow or a rain and snow combination if cap 28 is removed, although in view of the relatively small volume of the cone 22 it is not generally used for this purpose where the precipitation is expected to more than fill the cone.

In view of the cylinder 16 having the cone 18 as the bottom thereof, and due to the conical shape of the receptacle 22, the device is not injured in the event that the contents freeze with resulting expansion thereof. This is true because expansion within the cones tends to produce axial displacement of the frozen material.

It will be understood, therefore, that the invention contemplates a precipitation guage having a base supporting a cylinder with a conical bottom, an inner removable cone with overflow perforations in the wall thereof, and having a cap adapted to direct precipitation into the inner cone. For the measurement of rain the completely assembled device is used, the overflow being received from the inner cone in the cylinder and being accurately measured by pouring into the inner cone, and adding the aggregate of the initial contents of the cone and that from the cylinder. For measuring snow, or a combination of rain and snow, the cap and inner cone are perferably removed so that the precipitation is received directly in the cylinder. The snow, or snow and rain combination, is melted and poured into the cone for accurate measurement. Because of the conical shape of the bottom of the two receptacles, freezing and the expansion of the materials received therein is accommodated by axial movement so that the frozen precipitate does not injure the receptacle.

Although a particular embodiment of the invention has been disclosed it will be understood that it is not limited to such particular embodiment but that reasonable variations are within the scope of the invention and therefore it is only limited as defined in the following claims.

What is claimed is:

1. A precipitation gauge comprising a stand, a first receptacle comprising a cylinder having a conical bottom, the apex of said bottom extending below the base of said conical bottom, means supporting and positioning said receptacle on said stand, a cone mounted in the cylinder substantially axially thereof and in spaced relation from said conical bottom, the apex of said cone being substantially in the plane of the base of said conical bottom, the base of said cone being remote from said conical bottom and adjacent to the cylinder wall, said cone having perforations intermediate its apex and its base and lying in a plane transversely of the axis of the cone, and a cap for said cylinder, said cap comprising a funnel for directing precipitation into said cone and means for supporting said funnel on said cylinder.

2. A precipitation gauge comprising a stand, a first receptacle comprising a cylinder having a conical bottom, the apex of said bottom extending below the base of said conical bottom, means supporting and positioning said receptacle on said stand, a cone mounted in the cylinder substantially axially thereof and in spaced relation from said conical bottom, the apex of said cone extending downwardly, the base of said cone being remote from said conical bottom and adjacent to the cylinder wall, said cone having perforations intermediate its apex and its base and lying in a plane transversely of the axis of the cone, and a cap for said cylinder, said cap comprising a funnel for directing precipitation into said cone and means for supporting said funnel on said cylinder.

3. A precipitation gauge comprising a stand, a first receptacle comprising a cylinder having a conical bottom, the apex of said bottom extending below the base of said conical bottom, means supporting and positioning said receptacle on said stand, a cone mounted in the cylinder substantially axially thereof and in spaced relation from said conical bottom, the apex of said cone extending downwardly, the base of said cone being remote therefrom and adjacent to the cylinder wall, said cone having overflow means intermediate its apex and its base, and a funnel for directing precipitation into said cone.

4. A precipitation gauge comprising a receptacle having a tapered bottom, means supporting and uprightly positioning said receptacle, a tapered container mounted in the receptacle and in spaced relation from said tapered bottom, the mouth of said tapered container being remote from said tapered bottom, said tapered container having overflow means intermediate its apex and its base.

5. The structure of claim 4, said tapered container having graduations indicative of the amount of precipitation contained by it at a given level therein.

References Cited in the file of this patent

UNITED STATES PATENTS

| Number | Name | Date |
|---|---|---|
| 756,109 | Friez | Mar. 29, 1904 |
| 1,118,259 | Beard | Nov. 24, 1914 |
| 2,497,759 | Cappleman, Jr. | Feb. 14, 1950 |

FOREIGN PATENTS

| 829,814 | Germany | Jan. 28, 1952 |